United States Patent
Jiang

(10) Patent No.: US 8,315,242 B2
(45) Date of Patent: *Nov. 20, 2012

(54) METHOD AND APPARATUS FOR HANDLING TIMERS DURING REESTABLISHING TRANSMITTING SIDES IN WIRELESS COMMUNICATIONS SYSTEMS

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 133 days.

This patent is subject to a terminal disclaimer.

(21) Appl. No.: 11/524,368

(22) Filed: Sep. 21, 2006

(65) Prior Publication Data

US 2007/0064599 A1    Mar. 22, 2007

Related U.S. Application Data

(60) Provisional application No. 60/596,402, filed on Sep. 21, 2005.

(51) Int. Cl.
*H04J 3/24* (2006.01)
(52) U.S. Cl. .......... 370/346; 455/502; 714/18; 714/748; 370/229; 370/350; 370/449
(58) Field of Classification Search .......... 455/517, 455/181.1, 231, 208, 502; 714/18, 750; 370/229, 370/313, 346, 350, 469, 230, 304, 324, 395.62, 370/503, 507, 509, 510, 512
See application file for complete search history.

(56) References Cited

U.S. PATENT DOCUMENTS

| 6,697,331 | B1 | 2/2004 | Riihinen | |
|---|---|---|---|---|
| 6,763,491 | B2 * | 7/2004 | McDonnell | 714/750 |
| 6,842,445 | B2 | 1/2005 | Ahmavaara | |
| 6,922,393 | B2 | 7/2005 | Jiang et al. | |
| 6,947,394 | B1 | 9/2005 | Johansson | |
| 6,987,981 | B2 | 1/2006 | Kuo | |
| 7,054,270 | B2 * | 5/2006 | Yi et al. | 370/232 |
| 7,171,224 | B2 | 1/2007 | Sarkkinen | |
| 7,325,172 | B2 | 1/2008 | Jang | |
| 7,411,979 | B2 | 8/2008 | Jiang | |
| 2002/0090005 | A1 | 7/2002 | Jiang et al. | |
| 2003/0016698 | A1 | 1/2003 | Chang et al. | |

(Continued)

FOREIGN PATENT DOCUMENTS

CN         1476182        2/2004

(Continued)

OTHER PUBLICATIONS

3GPP TS 25.322 V6.4.0 (Jun. 2005), "Radio Link Control (RLC) Protocol Specification (Release 6)".

(Continued)

*Primary Examiner* — Anthony Addy
*Assistant Examiner* — Khalid Shaheed
(74) *Attorney, Agent, or Firm* — Blue Capital Law Firm, P.C.

(57) ABSTRACT

A communications device utilized in a wireless communications system has an RLC entity with a transmitting side and a receiving side. Handling timers during reestablishment of the transmitting side includes only reestablishing the transmitting side in the RLC entity of the communications device, stopping a first timer corresponding to the transmitting side, and prolonging and not stopping a second timer corresponding to the transmitting side. The second timer is not a periodic timer.

10 Claims, 3 Drawing Sheets

U.S. PATENT DOCUMENTS

| | | | |
|---|---|---|---|
| 2003/0191844 A1* | 10/2003 | Meyer et al. | 709/227 |
| 2003/0206534 A1 | 11/2003 | Wu | |
| 2004/0032851 A1 | 2/2004 | Wu | |
| 2004/0037327 A1 | 2/2004 | Torsner | |
| 2004/0047331 A1 | 3/2004 | Jang | |
| 2004/0076182 A1 | 4/2004 | Wu | |
| 2004/0148546 A1* | 7/2004 | Meyer et al. | 714/18 |
| 2004/0153896 A1* | 8/2004 | Jang | 714/701 |
| 2004/0184437 A1 | 9/2004 | Lee | |
| 2004/0203623 A1 | 10/2004 | Wu | |
| 2004/0252719 A1 | 12/2004 | Jami | |
| 2005/0036477 A1* | 2/2005 | Jiang | 370/350 |
| 2005/0287957 A1 | 12/2005 | Lee | |
| 2006/0056441 A1 | 3/2006 | Jiang | |
| 2006/0098574 A1 | 5/2006 | Yi | |
| 2006/0154603 A1 | 7/2006 | Sachs | |
| 2006/0281413 A1* | 12/2006 | Burbidge et al. | 455/67.11 |

FOREIGN PATENT DOCUMENTS

| | | |
|---|---|---|
| EP | 1 389 886 A1 | 2/2004 |
| EP | 1424823 A1 | 6/2004 |
| JP | 2001-285350 | 10/2001 |
| JP | 2003-111147 | 4/2003 |
| JP | 2003-224618 A | 8/2003 |
| JP | 2004179917 | 6/2004 |
| JP | 2004364277 | 12/2004 |
| JP | 2005073250 | 3/2005 |
| JP | 2006522560 | 9/2006 |
| KR | 2003-0005064 A | 1/2003 |
| KR | 10-2004-0015672 A | 2/2004 |
| KR | 10-2004-0034398 A | 4/2004 |
| KR | 10-2007-0037979 | 4/2007 |
| TW | 496058 | 7/2002 |
| TW | 577204 | 2/2004 |
| TW | 588513 | 5/2004 |
| TW | I223520 | 11/2004 |
| WO | 2004091130 A1 | 10/2004 |

OTHER PUBLICATIONS

R2-052168 "Single Sided RLC Re-establishment", Motorola, 3GPP RAN2 #48 meeting, Aug. 2005.

Xu et al., Proceedings of the 2002 Winter Simulation Conference, pp. 506-512.

3GPP TS 25.322 V5.11.0, Radio Link Control (RLC) protocol specification (Release 5), Jun. 2005, p. 52-p. 53.

* cited by examiner

METHOD AND APPARATUS FOR HANDLING TIMERS DURING REESTABLISHING TRANSMITTING SIDES IN WIRELESS COMMUNICATIONS SYSTEMS

CROSS REFERENCE TO RELATED APPLICATIONS

This application claims the benefit of U.S. Provisional Application No. 60/596,402, filed on Sep. 21, 2005 and entitled "Improved Single-Sided Re-establishment Method and Apparatus in a wireless communications system," the contents of which are incorporated herein by reference.

BACKGROUND OF THE INVENTION

1. Field of the Invention

The present invention relates to methods and apparatuses for reestablishing a transmitting side of a communications device in a wireless communications system, and more particularly, to a method and apparatus for handling timers during reestablishing only the transmitting side of an RLC layer of a communications device.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

Taking a signal communications protocol standard set forth by the 3rd Generation Partnership Project (3GPP) as an example, targeting the Access Stratum (AS), the 3G mobile communications system defines various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different corresponding modes according to different transmission quality requirements, such as: Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In AM, the RLC layer combines a transmitting side and a receiving side. The transmitting side and the receiving side each process transmission and reception through the RLC layer, and both sides can share system resources. In some circumstances, the RLC layer must be reestablished, e.g. when changing a PDU size. The prior art reestablishes the RLC layer by reestablishing the transmitting side or the receiving side.

Directed at operations corresponding to reestablishing the RLC layer, a communications protocol specification established by the 3GPP (3GPP TS 25.322 V6.4.0 (2005-06), "Radio Link Control (RLC) protocol specification (Release 6)") and a Change Request (R2-052168 "Single Sided RLC Reestablishment", Motorola, 3GPP RAN2 #48 meeting, August 2005) are already described in detail. The details of the communications protocol specification and the Change Request can be summarized as follows: When reestablishment of a transmitting side and/or a receiving side of an AM RLC entity is initiated by an upper layer, the RLC entity should execute the following two operations:

1. If the receiving side of the RLC entity is being reestablished, reset state variables (VR(R), VR(H), and VR(MR)) corresponding to a receiver; set configurable protocol parameters (Configured_Tx_Window_Size and Configured_Rx_Window_Size) corresponding to the receiver to accurate values; set a Hyper Frame Number of the receiving side (downlink of the receiver) to a value set by the upper layer; and discard all control PDUs of the receiving side and the transmitting side, and discard data PDUs of the receiving side. If only the receiving side is being reestablished, the prior arts described above have not yet disclosed a method of handling a timer.

2. If the transmitting side of the RLC entity is being reestablished, reset state variables (VT(S), VT(A), VT(DAT), VT(MS), VT(PDU), VT(SDU), VT(RST), VT(MRW), and VT(WS)) corresponding to a transmitter; set configurable protocol parameters (MaxDat, Poll_PDU, Poll_SDU, Poll_Window, MaxRST, MaxMRW, OSD_Window_Size, and DAR_Window_Size) corresponding to the transmitter to accurate values; set a Hyper Frame Number of the transmitting side (uplink of the receiver) to a value set by the upper layer. In this operation, if only the transmitting side of the RLC entity is being reestablished, discard all control PDUs of both the receiving side and the transmitting side, and discard all already successfully transmitted SDUs of the transmitting end. Segment any not yet discarded SDUs into PDUs again based on a configured size of the PDU. If the transmitting side and the receiving side of the RLC entity are both being reestablished, discard the control PDUs of the receiving side and the transmitting side, and discard the data PDUs of the receiving side. If the transmitting side is being reestablished, regardless of whether or not the receiving side is being reestablished, stop all timers except for Timer_Poll_Periodic, Timer_Status_Periodic, and Timer_Discard, which corresponds to the SDUs that have not yet been discarded. Finally, if needed, inform the upper layer of the SDUs that have already been discarded.

As mentioned above, when only the transmitting side is being reestablished, the prior art discards all of the control PDUs of the receiving side and the transmitting side, and will stop all of the timers except for a periodic polling timer Timer_Poll_Periodic, a periodic status timer Timer_Status_Periodic, and an SDU discard timer Timer_Discard. In other words, a status prohibiting timer Timer_Status_Prohibit will be stopped. If the status prohibiting timer Timer_Status_Prohibit is stopped, delivery of STATUS PDUs from the receiver will not be restricted by the status prohibiting timer Timer_Status_Prohibit, such that the STATUS PDUs may be delivered too frequently, which wastes wireless resources.

SUMMARY OF THE INVENTION

According to the present invention, a method of handling timers during re-establishing a transmitting side of a wireless communications system having a communications device having an RLC entity having a transmitting side and a transmitting side comprises only re-establishing the transmitting side in the RLC entity of the communications device, stopping a first timer corresponding to the transmitting side, and prolonging and not stopping a second timer corresponding to the receiving side. The second timer is not a periodic timer.

According to the present invention, a method of handling timers during re-establishing a transmitting side of a wireless communications system having a communications device having an RLC entity having a transmitting side and a transmitting side comprises only re-establishing the transmitting side in the RLC entity of the communications device, stopping a first timer corresponding to the transmitting side, and prolonging and not stopping a second timer corresponding to the receiving side. The second timer is not a periodic timer.

These and other objectives of the present invention will no doubt become obvious to those of ordinary skill in the art after reading the following detailed description of the preferred embodiment that is illustrated in the various figures and drawings.

DETAILED DESCRIPTION

In the communications protocol specification (3GPP TS 25.322 V6.4.0 (2005-06), "Radio Link Control (RLC) protocol specification (Release 6)") established by the 3GPP, parameters, variables, timers, and control PDUs, etc. are defined according to different operating requirements. Based on the above-mentioned communications protocol specification, the parameters, variables, and timers can be defined as corresponding to the transmitting side or the receiving side of the RLC layer. Taking status variables for AM as an example, status variables corresponding to status of the receiving side comprise VR(R), VR(H), and VR(MR). Status variables corresponding to status of the transmitting side comprise VT(S), VT(A), VT(DAT), VT(MS), VT(PDU), VT(SDU), VT(RST), VT(MRW), and VT(WS). Timers corresponding to the receiving side comprise Timer_Status_Periodic and Timer_Status_Prohibit. Timers corresponding to the transmitting side comprise Timer_Poll, Timer_Poll_Periodic, Timer_Poll_Prohibit, Timer_Discard, Timer_RST, and Timer_MRW. Protocol parameters corresponding to the receiving side comprise Configured_Tx_Window_Size and Configured_Rx_Window_Size. Protocol parameters corresponding to the transmitting side comprise MaxDAT, Poll_PDU, Poll_SDU, Poll_Window, MaxRST, MaxMRW, OSD_Window_Size, and DAR_Window_Size. Definitions for the above-mentioned status variables, timers, and protocol variables can be found in the communications protocol specification, and are not repeated here.

The present invention relates to a wireless communication system operating in Acknowledged Mode, and is utilized to reestablish the transmitting side accurately, so as to improve wireless transmission efficiency and prevent system errors. The wireless communications system is preferably a 3G mobile communications system.

Figure 1:
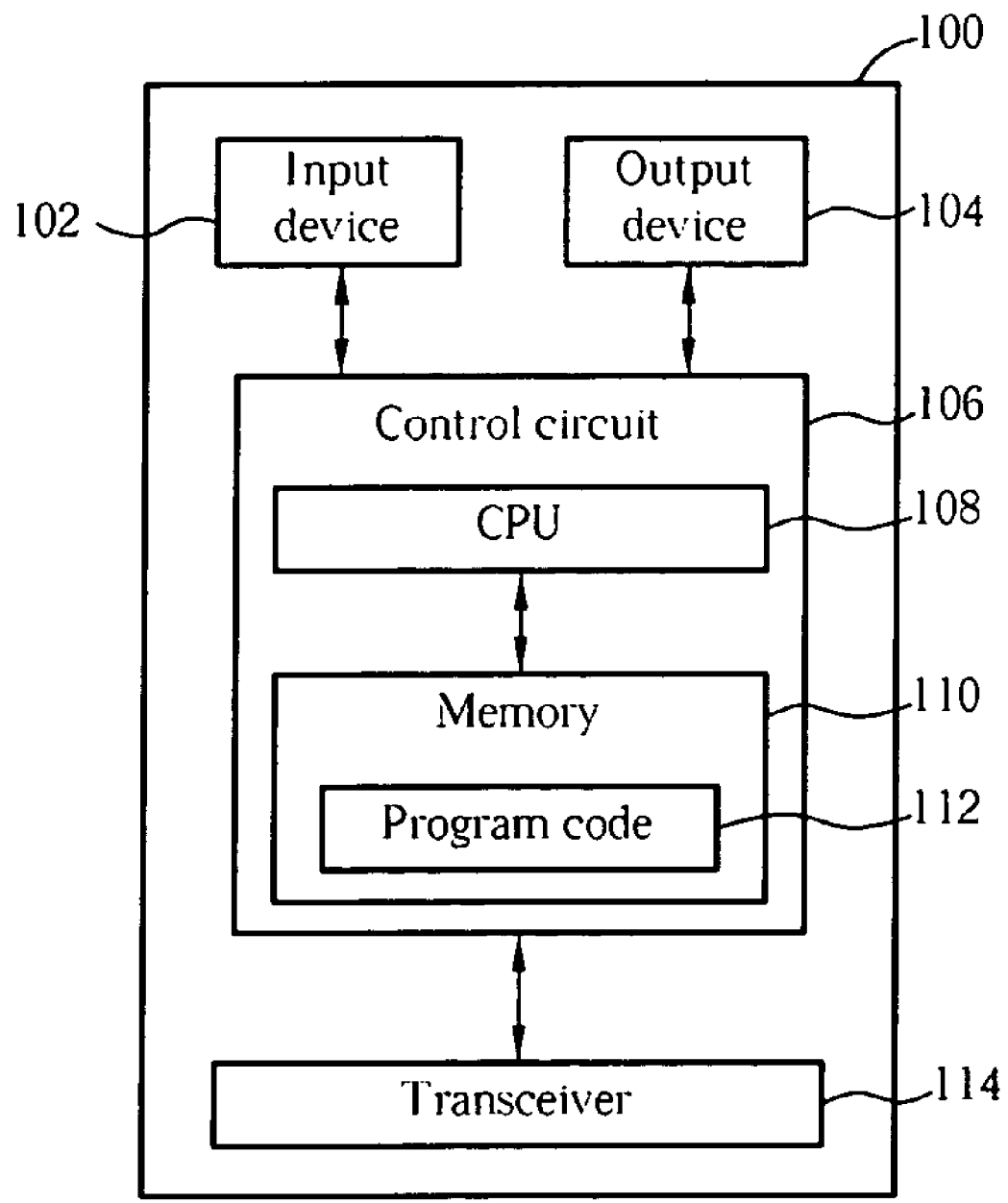
FIG. 1 is a functional block diagram of a communications device according to the present invention.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
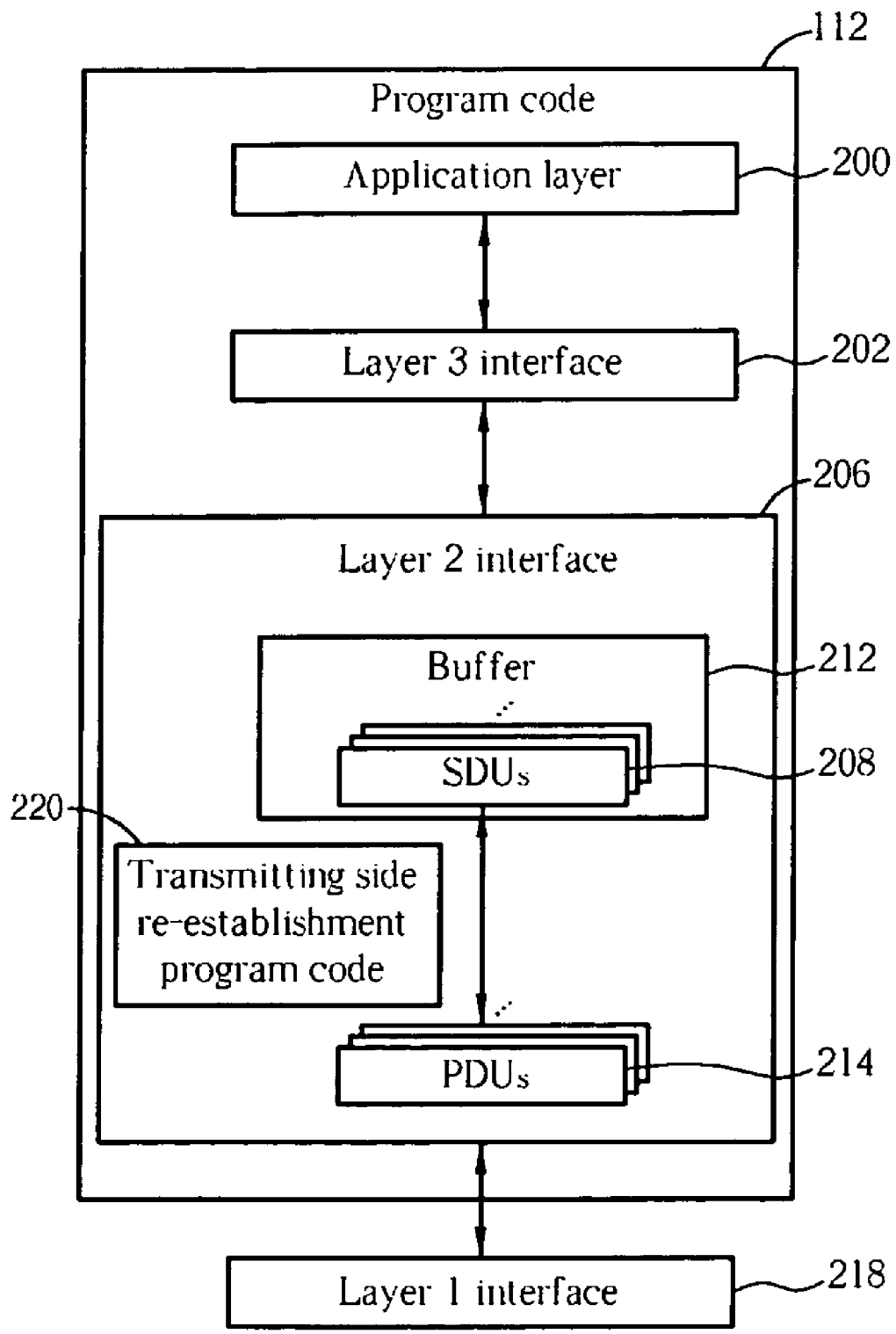
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

When the communications device 100 operates in AM, the Layer 2 interface 206 is a combination of the transmitting side and the receiving side. The transmitting side and the receiving side respectively represent the transmitting and receiving portions of the RLC layer. In some circumstances, the program code 112 must reestablish the Layer 2 interface 206. The present invention can reestablish the Layer 2 interface 206 through reestablishing the transmitting side based on transmitting side reestablishment program code 220.

Figure 3:
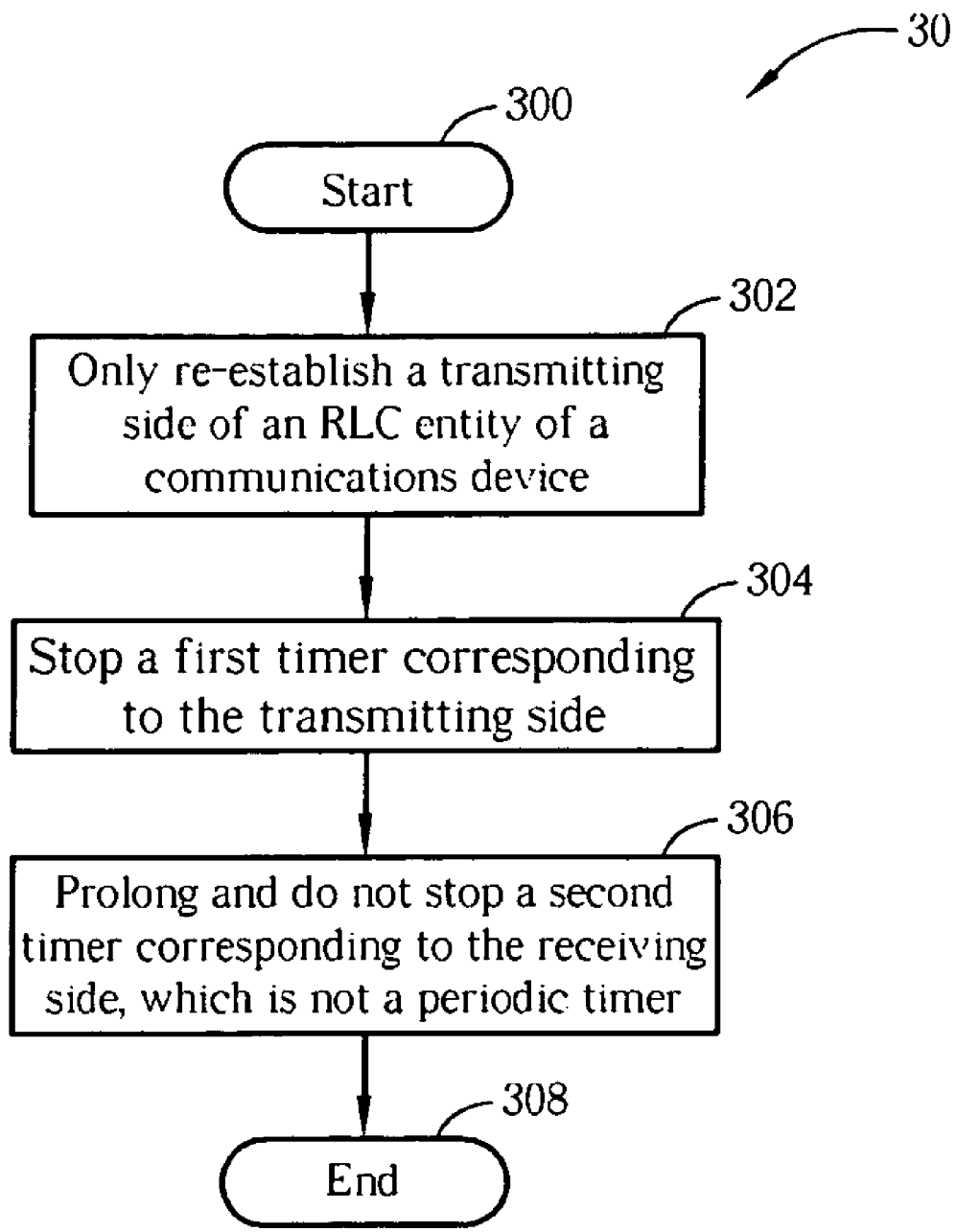
FIG. 3 is a flow chart diagram of a process according to the present invention.

Please refer to FIG. 3, which is a diagram of a process 30 according to the present invention. The process 30 is utilized to reestablish the transmitting side of the wireless communications system, and can be seen as the transmitting side reestablishment program code 220. The process 30 comprises steps of:

Step 300: Start.

Step 302: Only reestablishing the transmitting side in the RLC entity of the communications device.

Step 304: Stopping a first timer corresponding to the transmitting side

Step 306: Prolonging and not stopping a second timer corresponding to the receiving side, wherein the second timer is not a periodic timer.

Step 308: End.

According to the process 30, when only the transmitting side of the RLC entity is being reestablished, the present invention stops the first timer corresponding to the transmitting side, and prolongs and does not stop a second timer corresponding to the receiving side. Preferably, the first timer comprises all timers corresponding to the transmitting side except for the SDU discard timer Timer_Discard and the periodic polling timer Timer_Poll_Periodic, e.g. Timer_Poll, Timer_Poll_Prohibit, Timer_RST, and Timer_MRW. Timers corresponding to the receiving side could be Timer_Status_Periodic or Timer_Status_Prohibit. Because the prior art does not stop any periodic timers, the present invention particularly targets non-periodic timers. Thus, in Step 306, the second timer is Timer_Status_Prohibit or another non-periodic timer. Therefore, utilizing the process 30 of the present invention, when the transmitting side of the RLC entity is being reestablished, beyond similarities to the prior art, in which the RLC entity keeps Timer_Discard, Timer_Poll_Periodic, and Timer_Status_Periodic counting, the RLC entity also keeps Timer_Status_Prohibit counting.

In a second embodiment of the present invention, Step 306 of the process 30 can be modified to prolonging and not stopping all timers corresponding to the receiving side.

Simply speaking, when the RLC entity is only reestablishing the transmitting side, the preferred embodiment of the present invention stops all timers corresponding to the transmitting side except for the SDU discard timer Timer_Discard and the periodic polling timer Timer_Poll_Periodic, and does not stop any of the timers corresponding to the receiving side (Timer_Status_Periodic and Timer_Status_Prohibit). In this way, waste of wireless resources can be prevented. For example, according to the process 30, if the RLC entity is only reestablishing the transmitting side, e.g. a mobile phone uplink or a wireless networking downlink, Timer_Status_Prohibit is not stopped, such that delivery of STATUS PDUs of the receiving side is restricted, thereby preventing unneeded extra deliveries of the STATUS PDUs, and saving wireless resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling timers during re-establishing a transmitting side of a wireless communications system having a communications device having an RLC (Radio Link Control) entity having a transmitting side and a receiving side, wherein when both the transmitting side and the receiving side in the RLC entity are being re-established, a first timer corresponding to the transmitting side is stopped and a second timer corresponding to the receiving side is stopped, the method comprising:
   re-establishing the transmitting side in the RLC entity and not re-establishing the receiving side in the RLC entity;
   stopping the first timer;
   not stopping the second timer when re-establishing the transmitting side in the RLC entity and not re-establishing the receiving side in the RLC entity;
   wherein the second timer is not a periodic timer; and
   wherein stopping the first timer corresponding to the transmitting side is stopping all timers corresponding to the transmitting side other than an SDU discard timer (Timer_Discard) and a periodic polling timer (Timer_Poll_Periodic).

2. A communications device utilized in a wireless communications system, an RLC (Radio Link Control) entity of the communications device having a transmitting side and a receiving side, utilized for accurately establishing the transmitting side, wherein when both the transmitting side and the receiving side in the RLC entity are being re-established, a first timer corresponding to the transmitting side is stopped and a second timer corresponding to the receiving side is stopped, the communications device comprising:
   a control circuit for realizing functions of the communications device;
   a central processing unit for executing a program code to operate the control circuit; and
   a memory for storing the program code;
   wherein the processor executes the program code to:
      re-establish the transmitting side in the RLC entity and not re-establishing the receiving side in the RLC entity;
      stop the first timer;
      not stop the second timer when re-establishing the transmitting side in the RLC entity and not re-establishing the receiving side in the RLC;
      wherein the second timer is not a periodic timer; and
      wherein stopping the first timer corresponding to the transmitting side is stopping all timers corresponding to the transmitting side other than an SDU discard timer (Timer_Discard) and a periodic polling timer (Timer_Poll_Periodic).

3. The method of claim 1, wherein the periodic timer is a periodic status timer (Timer_Status_Periodic).

4. The method of claim 1, wherein the second timer corresponding to the receiving side is a status prohibiting timer (Timer_Status_Prohibit).

5. The method of claim 1, wherein the wireless communications system operates in acknowledged mode (AM).

6. The method of claim 1, wherein the communications device is a mobile phone, a wireless mobile phone, a wireless communications device, or a networking device.

7. The device of claim 2, wherein the wireless communications system operates in acknowledged mode (AM).

8. The device of claim 2, wherein the communications device is a mobile phone, a wireless mobile communications device, or a networking device.

9. The device of claim 2, wherein the periodic timer is a periodic status timer (Timer_Status_Periodic).

10. The device of claim 2, wherein the second timer corresponding to the receiving side is a status prohibiting timer (Timer_Status_Prohibit).

\* \* \* \* \*